(12) United States Patent
Jansson

(10) Patent No.: US 8,430,607 B2
(45) Date of Patent: Apr. 30, 2013

(54) CUTTING INSERT WITH RECESSED INSERT SUPPORTING SURFACE, AND CUTTING TOOL

(75) Inventor: Mikael Jansson, Avesta (SE)

(73) Assignee: Seco Tools AB, Fagersta (SE)

(*) Notice: Subject to any disclaimer, the term of this patent is extended or adjusted under 35 U.S.C. 154(b) by 139 days.

(21) Appl. No.: 13/202,791

(22) PCT Filed: Feb. 26, 2010

(86) PCT No.: PCT/SE2010/050226
§ 371 (c)(1),
(2), (4) Date: Aug. 25, 2011

(87) PCT Pub. No.: WO2010/101514
PCT Pub. Date: Sep. 10, 2010

(65) Prior Publication Data
US 2011/0305535 A1 Dec. 15, 2011

(30) Foreign Application Priority Data
Mar. 6, 2009 (SE) ....................... 0900286

(51) Int. Cl.
*B23B 27/16* (2006.01)
*B23C 5/22* (2006.01)

(52) U.S. Cl.
USPC .............. 407/113; 407/114; 407/103; 407/66

(58) Field of Classification Search ............ 407/30, 407/33, 103, 113, 114, 115, 116
See application file for complete search history.

(56) References Cited

U.S. PATENT DOCUMENTS

| 3,490,117 A | 1/1970 | Hertel |
| 3,512,236 A | 5/1970 | Renaud |
| 3,574,911 A | 4/1971 | Penoyar |
| 4,531,864 A | 7/1985 | Bylund |
| 5,443,334 A * | 8/1995 | Pantzar .................... 407/113 |
| 6,053,671 A | 4/2000 | Stedt et al. |
| 6,164,878 A * | 12/2000 | Satran et al. ................ 407/113 |

(Continued)

FOREIGN PATENT DOCUMENTS

| DE | 3642514 C1 | 6/1986 |
| EP | 0936015 A1 | 8/1999 |

(Continued)

OTHER PUBLICATIONS

Espacenet Abstract for JP8206910 A, published Aug. 13, 1993 "Cutting Insert and its Holder" KyoceraCorp.

(Continued)

*Primary Examiner* — Will Fridie, Jr.
(74) *Attorney, Agent, or Firm* — WRB-IP LLP

(57) ABSTRACT

A cutting insert includes a first chip surface, a second surface on an opposite side of the insert from the first chip surface, and a side surface extending between the first chip surface and the second surface, at least part of one first cutting edge being defined by an intersection of the side surface with the first chip surface. The side surface includes at least one recess, the recess including an insert supporting surface for supporting the insert relative to a protruding abutment surface on a toolholder and a flat auxiliary insert supporting surface for supporting the insert relative to a non-protruding, flat abutment surface. A cutting tool is also provided.

18 Claims, 4 Drawing Sheets

U.S. PATENT DOCUMENTS

| | | |
|---|---|---|
| 6,702,528 B2 | 3/2004 | Jansson |
| 8,096,735 B2 * | 1/2012 | Sladek et al. .................. 407/114 |
| 8,277,151 B2 * | 10/2012 | Wandeback .................... 407/42 |
| 2002/0090272 A1 | 7/2002 | Waggle |
| 2006/0210364 A1 | 9/2006 | Bellmann et al. |

FOREIGN PATENT DOCUMENTS

| | | |
|---|---|---|
| FR | 2431891 | 2/1980 |
| WO | 9700750 A1 | 1/1997 |
| WO | WO0023218 A1 | 4/2000 |
| WO | 02092267 A1 | 11/2002 |
| WO | 03026824 A1 | 4/2003 |
| WO | 2004062840 A1 | 12/2003 |
| WO | 2004062840 A1 | 7/2004 |
| WO | 2005009660 A1 | 2/2005 |

OTHER PUBLICATIONS

Espacenet Abstract for JP2000052111 A, published Feb. 22, 2000, "Throwaway Tip Holding Mechanism for Cutting Tool", Mitsubishi Materials Corp.

International Search Report for corresponding International Application PCT/SE2010/050226.

* cited by examiner

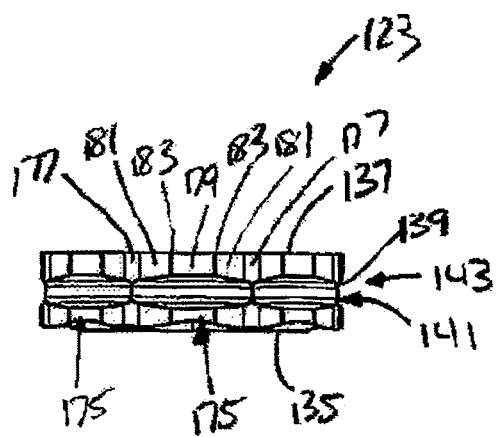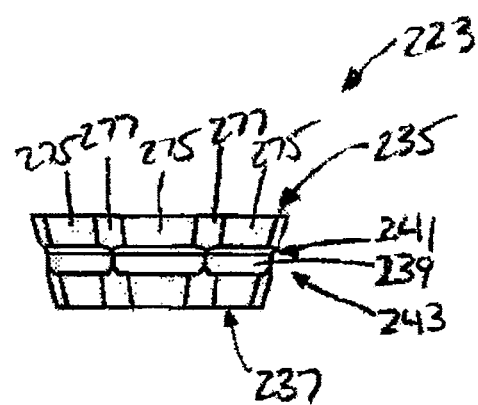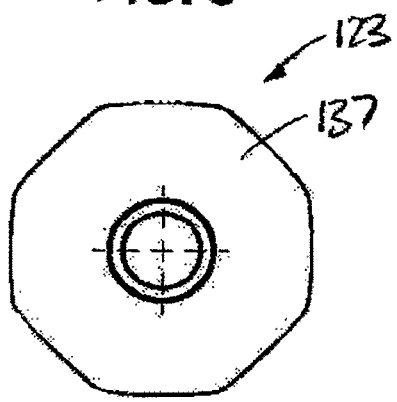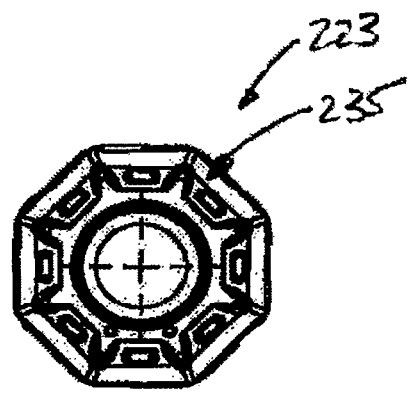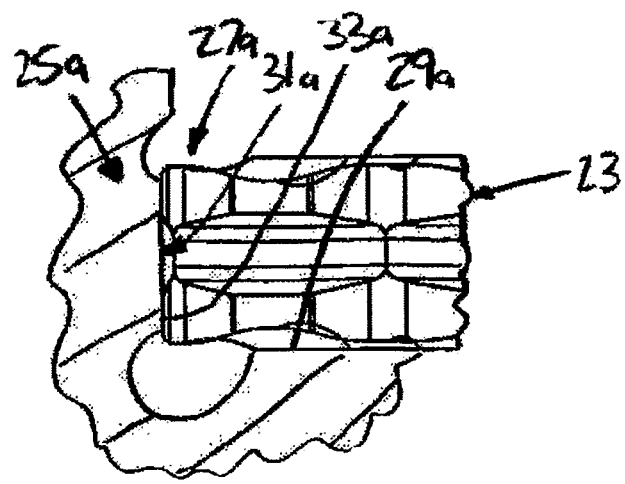

CUTTING INSERT WITH RECESSED INSERT SUPPORTING SURFACE, AND CUTTING TOOL

BACKGROUND AND SUMMARY

The present invention relates generally to a cutting insert and a cutting tool and, more particularly, to a cutting insert with a recess having an insert supporting surface, the cutting insert being mountable relative to a cutting tool so that the insert supporting surface contacts a protruding abutment surface of the cutting tool.

As explained in U.S. Pat. No. 6,702,528, which is incorporated by reference, it is possible to mount a cutting insert in the pocket of a toolholder so that an insert supporting surface of the cutting insert abuts an abutment surface formed by a pin provided in a cavity in the toolholder. If the pin is made of a material harder than the toolholder body, then it is possible to, inter alia, avoid problems associated with plastic deformation of the walls of the pocket that might occur during cutting. The insert supporting surface of the insert is a clearance surface. The applicant has observed that, after an insert has been used, the clearance surface forming the insert supporting surface may become worn, which can prevent the insert from seating properly in the pocket.

It is desirable to provide an improved arrangement for mounting a cutting insert relative to a toolholder. It is also desirable to provide an insert with a substantial number of usable cutting edges that will seat properly relative to a toolholder substantially regardless of a degree of wear on the insert.

According to an aspect of the present invention, a cutting insert comprises a first chip surface, a second surface on an opposite side of the insert from the first chip surface, and a side surface extending between the first chip surface and the second surface, at least part of one first cutting edge being defined by an intersection of the side surface with the first chip surface. The side surface comprises at least one recess, the recess including an insert supporting surface for supporting the insert relative to a protruding abutment surface on a toolholder and a flat auxiliary insert supporting surface for supporting the insert relative to a non-protruding, flat abutment surface.

According to another aspect of the present invention, a cutting tool comprises an insert as described above and further comprises a toolholder comprising a pocket for receiving the insert, the pocket comprising at least a first abutment surface and a second surface comprising a protruding abutment surface such that, when the insert is received in the pocket, a chip face of the insert abuts against the first abutment surface and the insert supporting surface abuts against the protruding abutment surface.

BRIEF DESCRIPTION OF THE DRAWINGS

The features and advantages of the present invention are well understood by reading the following detailed description in conjunction with the drawing in which like numerals indicate similar elements and in which:

FIGS. 3A and 3B are enlarged views of an insert seated in different pockets of toolholders;

FIG. 8 is a side view of a cutting insert according to another aspect of the present invention;

FIG. 9 is a bottom view of the cutting insert according to FIG. 8;

FIG. 10 is a side view of a cutting insert according to another aspect of the present invention; and FIG. 11 is a top view of the cutting insert according to FIG. 10.

DETAILED DESCRIPTION

Figure 1:
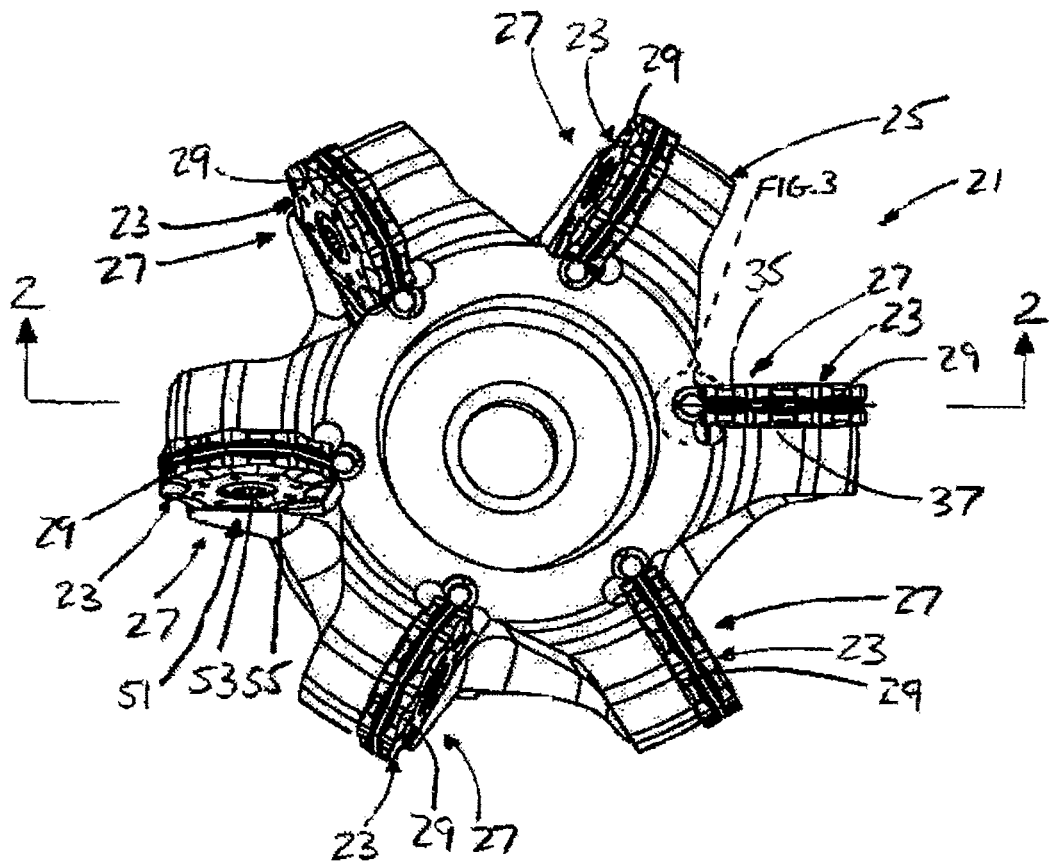
FIG. 1 is a bottom plan view of a cutting tool according to an aspect of the present invention.
Figure 2:
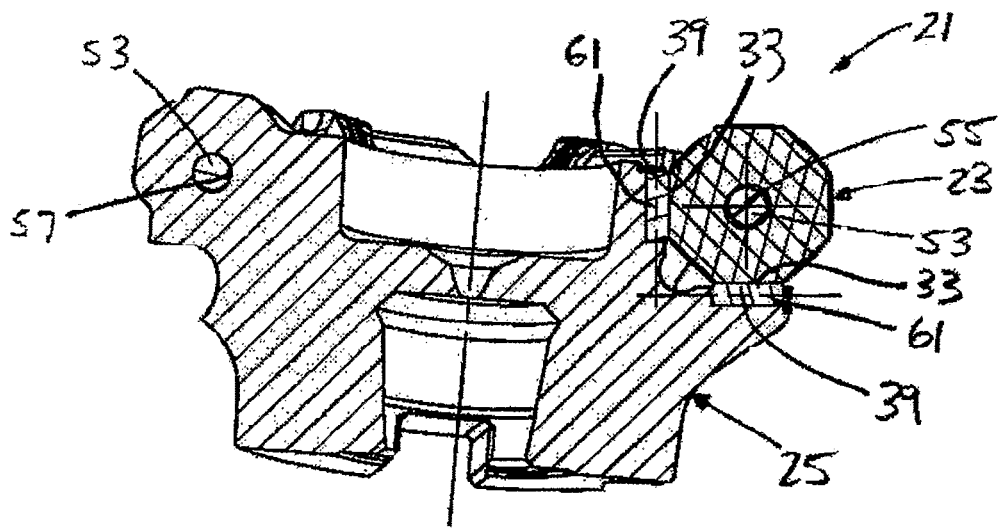
FIG. 2 is a cross-sectional view of the cutting tool at Section 2-2 of FIG. 1.
Figure 3A:
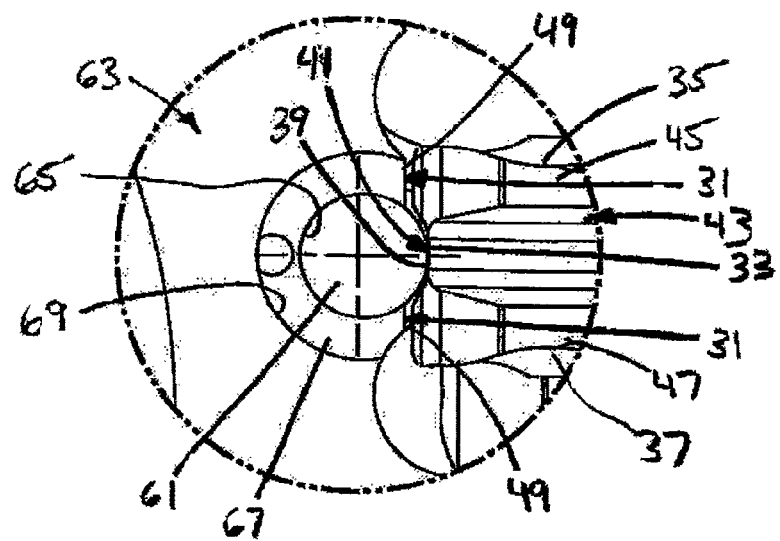

A cutting tool 21 comprising an insert 23 is shown in FIGS. 1 and 2. The cutting tool 21 comprises a toolholder 25 comprising a pocket 27 for receiving the insert 23. The pocket comprises at least a first, usually planar, abutment surface 29 and a second surface 31 (FIG. 3A) comprising a protruding abutment surface 33. As seen in FIG. 3B, a toolholder 25a can comprise a pocket 27a including a first, usually planar, abutment surface 29a and a second surface 31a comprising a flat abutment surface 33a. A flat abutment surface (not shown) may also result from removing a protruding abutment surface from a pocket.

Figure 5:
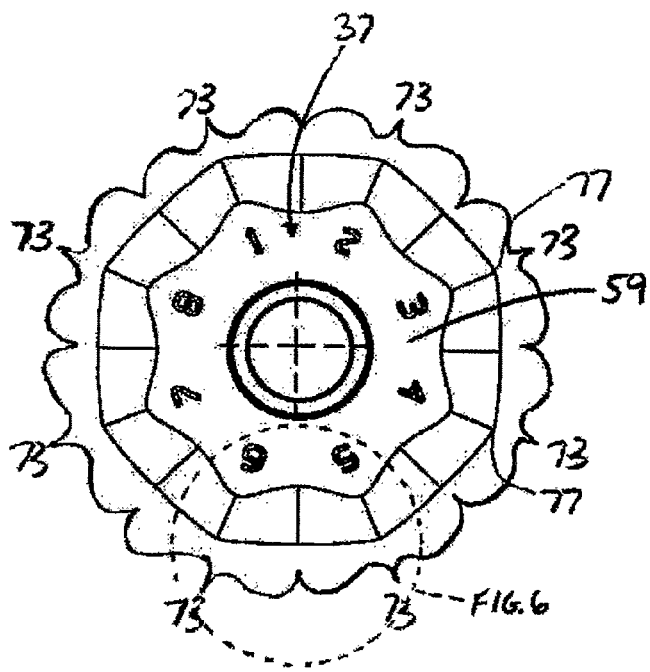
FIG. 5 is a top plan view of a cutting insert according to an aspect of the present invention.
Figure 6:
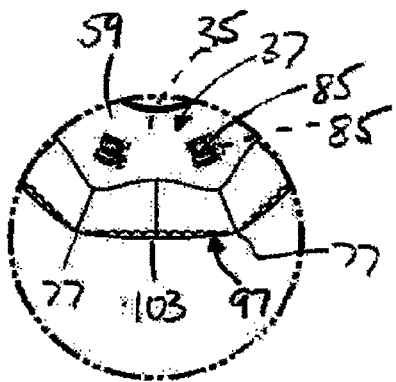
FIG. 6 is an enlarged view of portion "6" of the cutting insert of FIG. 5.

When the insert 23 is received in the pocket 29, a first chip face 35 (FIGS. 4 and 7) or a second chip face 37 (FIGS. 5-7) of the insert 23 abuts against the first abutment surface 29 and an insert supporting surface 39 in a recess 41 in a side surface 43 abuts against the protruding abutment surface 33. As seen in FIG. 3A, when the insert supporting surface 39 supports the insert 23 against the protruding abutment surface 33, surfaces of the insert adjacent the recess 41 (here, first and second clearance surfaces 45 and 47) can be spaced at a distance from a remaining, usually planar portion 49 of the second surface 33.

As seen in FIGS. 1 and 2, a clamp 51 is provided to clamp the insert 23 in the pocket 27. The clamp can be in any suitable form. The clamp can, for example, be in the form of a screw 53 that extends through a central hole 55 in the insert and into a threaded hole 57 (FIG. 2) in the toolholder 25 so that a head of the screw abuts a frustoconical surface of the central hole to clamp the insert in place. An alternative form of clamp (not shown) can comprise a screw and a wedge that is movable in a wedge-receiving pocket formed in the toolholder, wherein the screw extends through a hole in the wedge and threads on the screw mate with internal threads formed in a threaded hole in the toolholder. By screwing the screw further into the hole, the wedge is forced against a central portion of the one of the chip surfaces 35 and 37 that is not abutting the first abutment surface to clamp the insert in the pocket.

As seen in FIG. 3A, the protruding abutment surface 33 can be part of a member 61 detachable from a body 63 of the toolholder 25. The member 61 can be formed of a material harder than the body 63. In this way, the chance of the insert 23 being seated improperly because of damage to the relatively softer material of the body against which it would otherwise abut can be minimized. The member 61 can be cylindrical and, ordinarily, is circularly cylindrical, although the member can have other shapes. The member 61 may, for example, be barbell shaped along its length to provide two distinct points of contact, or may be polygonal in cross-section. The member 61 need not be cylindrical and may, for example, be in the form of one or more balls. When the member 61 is circularly cylindrical or in the form of balls, the recess 41 in the side surface 43 of the insert 23 will ordinarily define an arc of a circle when viewed in cross-section, as seen in, e.g., FIGS. 3, 4, and 7. Ordinarily, the insert 23 will contact the pocket 27 at two locations on the side surface 43 of the insert by two separate protruding abutment surfaces 33 (ordinarily formed by detachable members 61) as seen in FIG. 2, and at one location on one of the two chip surfaces 35 or 37 by the first abutment surface 29 (as seen in FIG. 1). Depending upon the type of clamp 51 used, the insert 23 may also be contacted at one location on the other one of the two chip surfaces 37 or 35 by the clamp. The cutting insert 23 may be in contact with the pocket 27 at two locations on the side surface 43 of the insert by two separate protruding abutment surfaces 33 formed by the members 61 and at one location on one of the two chip surfaces 35 or 37 by the first abutment surface 29. There are preferably two members 61 in each pocket. The members 61 may form a 90 degree angle to each other.

Ordinarily, as seem in FIG. 3A, the member 61 is received in an opening 65 that is formed in the body 63 of the toolholder 25, such as by drilling, so that the opening extends to the second surface 31 and so that part of the member 61 can extend beyond the second surface. If the member 61 is damaged, it may be possible to rotate the member about its axis so that another, undamaged portion of the member extends beyond the second surface 31. The opening 65 may be provided in a sleeve 67 that is received in a larger opening 69 in the body, and the sleeve 67 may define part or all of the second surface 31.

The cutting insert 23 comprises a first chip surface 35 (FIG. 4) and a second surface which, in the embodiment shown in FIGS. 1-6, is a second chip surface 37 (FIGS. 3-7), the first and second chip surfaces being substantially identical. The side surface 43 extends between the first chip surface 35 and the second chip surface 37. At least part of one first cutting edge 71 and at least part of one second cutting edge 73 are defined by intersections of the side surface 43 with each of the first chip surface 35 and the second chip surface 37, respectively. The side surface 43 comprises at least one recess 41, and the recess includes the insert supporting surface 39 for supporting the insert 23 relative to the protruding abutment surface 33 on the toolholder 25. The side surface 43 can comprise a first clearance surface 45 and a second clearance surface 47 between the recess 41 and the first cutting edge 71 and the second cutting edge 73, respectively.

The side surface 43 ordinarily comprises a plurality of surface portions 75. At least part of one first cutting edge 71 and at least part of one second cutting edge 73 are defined by intersections of each surface portion 75 with each of the first chip surface 35 and the second chip surface 37, respectively. Ordinarily, at least parts of two first cutting edges 71 and two second cutting edges 73 are defined by intersections of each surface portion 75 with each of the first chip surface 35 and the second chip surface 37, respectively. Ordinarily, each surface portion 75 intersects with another surface portion at a corner 77, and at least parts of one first cutting edge 71 and at least one second cutting edge 73 are defined by intersections of each corner with each of the first chip surface 35 and the second chip surface 37, respectively. The corners 77 can be flat but, typically, are radiused as seen, for example, in FIGS. 5 and 6. The recess 41 can extend to the corners 77 as shown, or can stop short of the corners.

Figure 4:
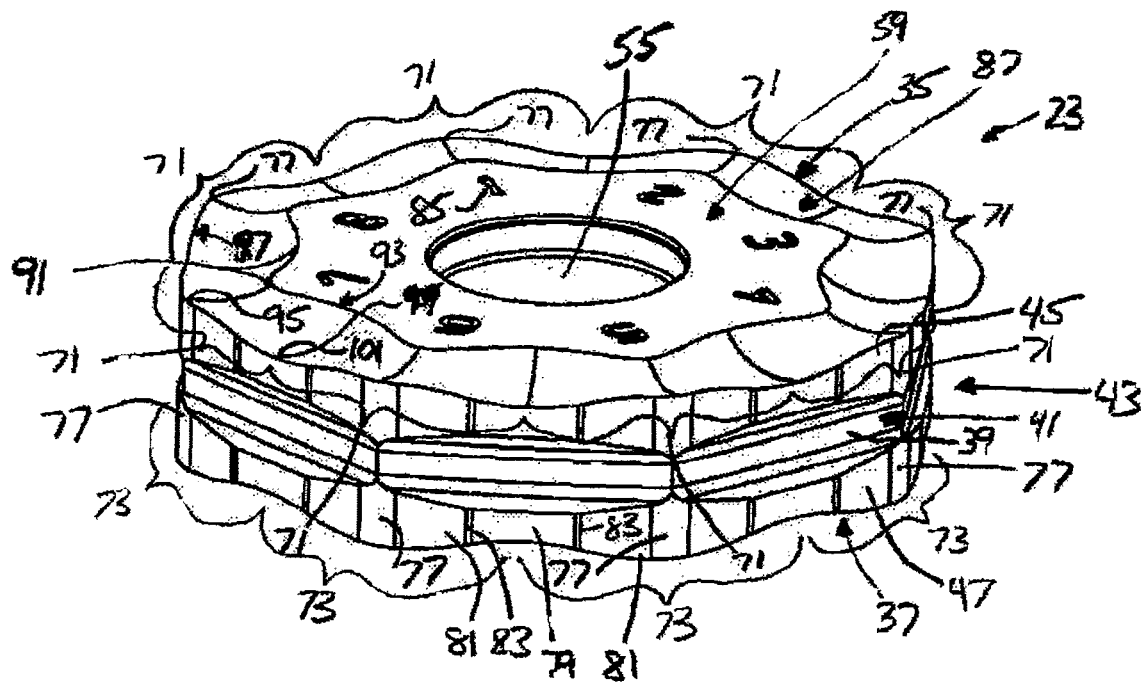
FIG. 4 is a perspective view of a cutting insert according to an aspect of the present invention.

Each side surface portion 75 typically comprises a first or central section 79 and two second or lateral sections 81 on opposite sides of the central section. The lateral sections 81 are typically separated from the central section 79 by a transition section 83 that is substantially perpendicular to a longitudinal direction of the recess 41. The central section 79 and the lateral sections 81 can be planar or substantially planar and parallel or non-parallel, such as where they intersect and define a small angle (such as less than 5°) at the transition section 83. The central section 79 and the lateral sections 81 are typically flat, and the transition sections 83 are typically radiused. As seen in FIG. 4, a cutting edge 71 or 73 can be formed by the intersections with the first chip surface 35 or the second chip surface 37, respectively, of a corner 77, the lateral sections 81 on opposite sides of the corner, and parts of the central sections 79 on opposite sides of the corner.

Indicia 85 such as numerals can be provided on the first chip surface 35 (shown in phantom in FIG. 6) and the second chip surface 37 corresponding to each cutting edge 71 or 73. The inserts 23 shown in FIGS. 1-7 comprise eight surface portions 75 and form sixteen cutting edges, i.e., eight edges 71 (indicia "1" through "8" in FIG. 4) and eight edges 73 (indicia "9" through "16" in FIG. 5).

Figure 7:
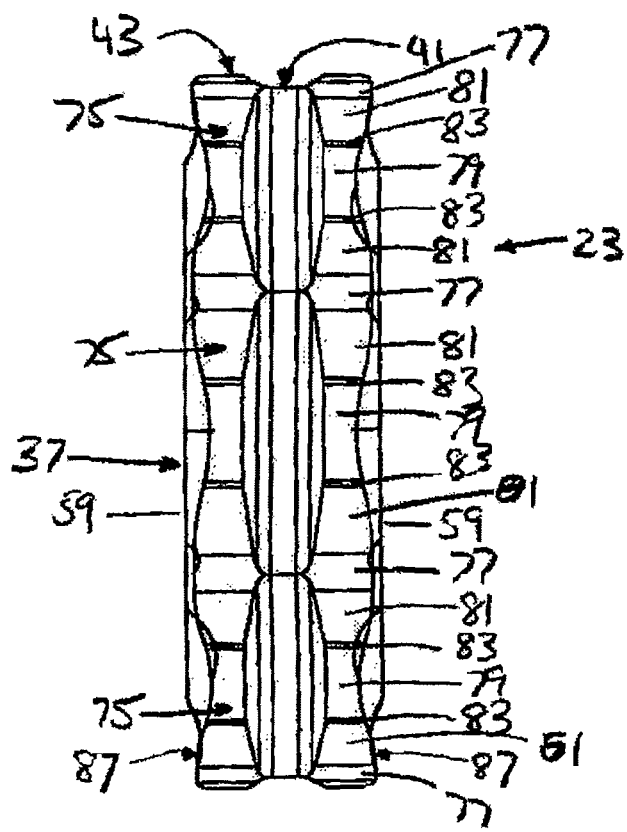
FIG. 7 is a side view of the cutting insert of FIG. 5.

When the insert supporting surface 39 in the recess 41 supports the insert against the protruding abutment surface 33 formed by the member 61, the clearance surfaces 45 and 47 do not support the insert 23 against the abutment surfaces 33 or the second surface 31. Accordingly, wear on the clearance surfaces 45 and 47 need not affect the proper seating and positioning of the insert. However, the clearance surfaces 45 and 47 can also comprise auxiliary insert supporting surfaces so that the insert is usable in a conventional toolholder (FIG. 3B) that is not provided with a member 61 or from which the member has been removed. In such a case, the insert supporting surface portions on the clearance surfaces will typically comprise part of at least the central section 79 of the side surface portion 75 (FIGS. 4 and 7). To facilitate proper seating of the insert 23 in a pocket of a toolholder having no protruding member, the central section 79 will ordinarily be flat so that it can abut against a flat portion of the pocket.

As seen in, e.g., FIGS. 4 and 7, ordinarily, each chip surface comprises an edge portion 87 extending inwardly from the cutting edges 71 and 73, and a central portion 59 elevated relative to the edge portion. The edge portion 87 can provide a transition between the cutting edges 71 and 73 and the central portion 59, the edge portion ordinarily being non-parallel and non-perpendicular to the central portion 59 to facilitate flow of chips from material cut by the cutting insert. To further facilitate flow of chips, a portion 91 of an outer edge 93 of the central portion 59 can be closer to a portion 95 of an outer edge 97 of the edge portion 87 proximate a corner 77 generally at a center of the cutting edge 71 or 73 than a portion 99 of the outer edge of the central portion is to a portion 101 of the outer edge of the edge portion proximate a center of each surface portion 75 as seen in, e.g., FIG. 4 (showing geometry in exaggerated fashion compared to, e.g., FIGS. 5 and 6). A land 103 (FIG. 6) can be provided at the outer edge 97 of the edge portion 89.

FIGS. 1-7 show an embodiment of an insert wherein the insert is "double-sided", i.e., can be flipped over after cutting edges on one side are worn so that cutting edges on the other side can be used. FIGS. 8-9 show another embodiment of an insert 123 wherein the insert is "single-sided" and has a first chip surface 135 and a second surface 137 that is not a chip surface. Ordinarily, the second surface 137 will function primarily as an insert supporting surface for supporting the insert 123 in a pocket of a toolholder (not shown). The second surface 137 may be substantially flat or have a substantially flat portion, or it may be formed with a textured or otherwise non-flat surface that cooperates with another surface. The insert 123 can have a side surface 143 that is similar to the side surface 43 of the insert 23. The side surface 143 can be substantially perpendicular to main planes of the first chip surface 135 and the second surface 137, and can be provided with a recess 141 having an insert-supporting surface 139. The side surface 143 can also comprise side surface portions 175 and corner portions 177. The side surface portions 175 can comprise central and lateral portions 179 and 181 separated by transition portions 183. Parts of the side surface portions 175, such as parts of flat central portions 179, can also function as auxiliary insert supporting surface portions when the insert 123 is used in a pocket of a toolholder that does not have a member forming a protruding abutment surface. When part of the side surface portion 175 functions as an auxiliary insert supporting surface, it can be useful to use a part of the side surface portion between the recess 141 and the second surface 137 as an auxiliary insert supporting surface so that wear on a clearance surface between the chip surface 135 and the recess does not affect proper seating of the insert in a pocket of a toolholder.

FIGS. 10 and 11 show another embodiment of a single-sided insert 223. The insert 223 can comprise a top chip surface 235 that can be substantially the same as the top chip surfaces 35 and 135, and a bottom surface 237 that will ordinarily function primarily as an insert supporting surface and can be flat or textured as with the bottom surface 137. The side surface 243 can comprise side surface portions 275 and corner portions 277, and the side surface portions can comprise central and lateral portions separated by transition portions (not shown). The side surface 243 is not perpendicular to main planes of the top chip surface 235 and the bottom surface 237 but, rather, is angled to form an acute angle with the top chip surface and an obtuse angle with the bottom surface. The side surface 243 can be provided with a recess 241 having an insert-supporting surface 239. Parts of the side surface portions 275, such as parts of flat central portions, can also function as auxiliary insert supporting surface portions when the insert 223 is used in a pocket of a toolholder that does not have a member forming a protruding abutment surface. When part of the side surface portion 275 functions as an auxiliary insert supporting surface, it can be useful to use a part of the side surface portion between the recess 241 and the second surface 237 as an auxiliary insert supporting surface so that wear on a clearance surface between the chip surface 235 and the recess does not affect proper seating of the insert in a pocket of a toolholder.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The disclosures in Swedish patent application No. 0900286-6, from which this application claims priority, are incorporated herein by reference.

What is claimed is:

1. A cutting insert, comprising:
a first chip surface;
a second surface on an opposite side of the insert from the first chip surface; and
a side surface extending between the first chip surface and the second surface, at least part of one first cutting edge being defined by an intersection of the side surface with the first chip surface,
wherein the side surface comprises at least one recess, the recess including an insert supporting surface for supporting the insert relative to a protruding abutment surface on a toolholder and a flat auxiliary insert supporting surface for supporting the insert relative to a non-protruding, flat abutment surface.

2. The cutting insert as set forth in claim 1, wherein the side surface comprises a first clearance surface and a second clearance surface between the recess and the first cutting edge and the second cutting edge, respectively.

3. The cutting insert as set forth in claim 1, wherein the side surface comprises a plurality of surface portions, at least part of one first cutting edge being defined by intersections of each surface portion with the first chip surface.

4. The cutting insert as set forth in claim 1, wherein the side surface comprises a plurality of surface portions, at least parts of two first cutting edges being defined by intersections of adjacent surface portions with the first chip surface.

5. The cutting insert as set forth in claim 1, wherein the side surface comprises a plurality of surface portions, each surface portion intersecting with another surface portion at a corner, at least parts of one first cutting edge being defined by intersections of each corner with the first chip surface.

6. The cutting insert as set forth in claim 4, wherein each surface portion comprises a central section and two lateral sections on opposite sides of the central section, the central section and each lateral section being separated by a transition section substantially perpendicular to a longitudinal direction of the recess.

7. The cutting insert as set forth in claim 1, wherein the central and lateral sections of each surface portion are non-parallel.

8. The cutting insert as set forth in claim 1, wherein the side surface comprises eight surface portions.

9. The cutting insert as set forth in claim 1, wherein indicia are (85) provided on the first chip surface corresponding to each cutting edge.

10. The cutting insert as set forth in claim 1, wherein the recess defines an arc of a circle when viewed in cross-section.

11. The cutting insert as set forth in claim 1, wherein each chip surface comprises an edge portion and a central portion elevated relative to the edge portion, the edge portion providing a transition between the cutting edge and the central portion.

12. The cutting insert as set forth in claim 11, wherein the side surface comprises a plurality of surface portions, each surface portion intersecting with another surface portion at a corner, and in that, for each chip surface, a portion of an outer edge of the central portion can be closer to a portion of an outer edge of the edge portion proximate a corner generally at a center of the cutting edge than a portion (99) of the outer edge of the central portion is to a portion of the outer edge of the edge portion proximate a center of each surface portion.

13. A cutting tool comprising an insert as set forth in claim 1 and further comprising a toolholder comprising a pocket for receiving the insert, the pocket comprising at least a first abutment surface and a second surface (31) comprising a protruding abutment surface such that, when the insert is received in the pocket, a chip face of the insert abuts against the first abutment surface and the insert supporting surface abuts against the protruding abutment surface.

14. The cutting tool as set forth in claim 13, wherein the protruding abutment surface is part of a member mounted to a body of the toolholder, the member being formed of a material harder than the body.

15. The cutting tool as set forth in claim 14, wherein the member is cylindrical.

16. The cutting tool as set forth in claim 14, wherein the cutting insert is in contact with the pocket at two locations on the side surface of the insert by two separate protruding abutment surfaces formed by the members and at one location on one of the two chip surfaces by the first abutment surface.

17. The cutting tool as set forth in claim 16, wherein there are two members in each pocket.

18. The cutting tool as set forth in claim 17, wherein the members form a 90 degree angle to each other.

* * * * *